United States Patent [19]
Wood et al.

[11] Patent Number: 5,961,564
[45] Date of Patent: Oct. 5, 1999

[54] WHEEL SLIP CONTROL PARAMETER VARIATION PROCESS

[75] Inventors: James A. Wood, Spartanburg; David E. Schweikert, Moore, both of S.C.

[73] Assignee: Westinghouse Air Brake Company, Wilmerding, Pa.

[21] Appl. No.: 08/852,799

[22] Filed: May 7, 1997

[51] Int. Cl.$^6$ .................................. B60T 8/00; B60T 8/32
[52] U.S. Cl. ................................ 701/71; 701/19; 303/128
[58] Field of Search .................................. 701/19, 71, 78, 701/20; 303/128, 124; 246/168.1; 180/197; 318/370, 371

[56] References Cited

U.S. PATENT DOCUMENTS

| | | | |
|---|---|---|---|
| 4,071,282 | 1/1978 | Callahan et al. | 303/106 |
| 4,491,920 | 1/1985 | Wood et al. | 364/426 |
| 4,941,099 | 7/1990 | Wood et al. | 364/426.02 |
| 5,471,387 | 11/1995 | Wood et al. | 364/426.03 |
| 5,654,889 | 8/1997 | Wood et al. | 364/426.015 |
| 5,752,212 | 5/1998 | Wood et al. | 701/71 |

*Primary Examiner*—Michael Zanelli
*Attorney, Agent, or Firm*—James Ray & Associates

[57] ABSTRACT

A wheel slip control system employs a method of varying the detection and correction parameters it uses based on whether the wheel/axle combinations on a truck of a rail vehicle operate in the coupled or decoupled modes of operation. The control system executes programming code featuring detection and correction logic. The steps of the method include deriving both detection parameters optimized for each mode called coupled and decoupled detection parameters and correction parameters optimized for each mode called coupled and decoupled correction parameters. Another step involves monitoring the amount of dynamic braking applied to the wheel/axle combinations. Yet another step involves determining whether the amount of dynamic braking lies for a preset time period within a preset zone of operation for the dynamic braking of the wheel/axle combinations on the truck. The method provides the coupled detection parameters to the detection logic if the amount of dynamic braking lies within the preset zone for the preset time. Alternately, it provides the decoupled detection parameters to the detection logic if the amount of dynamic braking fails to lie within the preset zone for the preset time. The method provides the coupled correction parameters to the correction logic if the amount of dynamic braking lies within the preset zone for the preset time. Alternately, it provides the decoupled correction parameters to the correction logic only if the amount of dynamic braking fails to lie within the preset zone for the preset time when the wheel slip control system is inactive.

12 Claims, 2 Drawing Sheets

WHEEL SLIP CONTROL PARAMETER VARIATION PROCESS

CROSS-REFERENCE TO RELATED APPLICATIONS

The present application is related to copending application Ser. No. 08/912,105, entitled UNIVERSAL WHEEL SLIP FORCE CONTROL LOGIC, filed on Aug. 18, 1997. The copending patent application is assigned to the assignee of the present invention, and its teachings are incorporated into the present document by reference.

FIELD OF THE INVENTION

The present invention generally relates to a process for controlling the slipping of wheels on a rail vehicle that can be braked using either dynamic braking or friction braking. More particularly, the invention relates to a process for controlling wheel slippage on a passenger transit rail vehicle whose trucks have one or more axles controlled by a single dynamic brake controller. Even more particularly, the invention pertains to a process through which a wheel slip control system can vary the detection and correction parameters it selects according to whether the wheel/axle combinations on the truck are being decelerated using either dynamic or friction braking or a combination of both.

BACKGROUND OF THE INVENTION

There are a variety of wheel slip control systems whose construction and operation are well known in the rail transport industry. The common objective of all wheel slip control systems is to vary the force that the brakes apply to the wheels of the rail vehicle during braking so that the wheels neither slide nor lockup as they travel on the top surface of the railway track. By adjusting the force with which the brakes apply so as to prevent or at least reduce slipping, a brake control system can more safely and efficiently decelerate and stop a rail vehicle in a shorter distance than would be possible without the use of a wheel slip control system.

Wheel slip control systems essentially control the interaction between the wheels and the tracks on which they ride. The top surface of the rails on which the tread of the wheels ride is typically called the running surface. The wheel treads adhere to the running surface of the rails essentially by means of friction. Under any given set of operating conditions, there exists between a wheel tread and the running surface on which it rides a particular level of frictional adhesion. It is this friction between tread and running surface which allows the wheel treads to have traction on the rails as the vehicle travels along the tracks. Should the braking force applied to the wheels exceed that which can be sustained by the maximum amount of frictional adhesion inherent to the particular wheel tread-running surface environment at issue, the treads will no longer completely grip and thus slip, and maybe even slide, on the running surface. It is such slipping and sliding that wheel slip control systems attempt to eliminate or at least reduce.

The wheel slip control systems in the art today typically employ one or more microprocessors accompanied by a requisite number of memory storage devices. These memory devices may, of course, be either separate from or actually embodied in the microprocessor(s) (hereinafter "microprocessor"). The microprocessor executes a specific set of instructions contained in programming code. The programming code, according to whose directions or logic the wheel slip control system operates, is stored in these memory devices. The microprocessor and associated memory devices are typically housed within a single package referred to as the wheel slip controller. It is this controller that controls various other parts of the wheel slip control system as explained hereinafter.

The memory storage devices may also be used to store numerous tables of parameters or a number of individual parameters or both. These parameters are constants, with variable values, each of which is preselected to work in connection with the circumstances of its application. In other words, these parameters, whether individually or as part of a table, are generally "setup" or tuned to each individual application. As the microprocessor executes the instructions contained in the programming code, the programming code generally requires the microprocessor to retrieve one or more of the parameter values from memory to complete a particular task. Exactly which value in a parameter table, for example, the microprocessor retrieves depends on the conditions under which the vehicle is then operating. The parameters along with the programming code are required by the microprocessor to operate the wheel slip control system. The parameter values serve as referents for determining other variables in the process through which to control slipping of the wheels.

Wheel slip control systems ideally prevent or at least reduce slipping by detecting nascent slipping and then correcting accordingly the force applied by the brakes to the wheels of the truck on the rail vehicle. Simply described, after the wheel slip is detected, the wheel slip control system corrects (i.e., temporarily reduces) the braking force applied to the slipping wheel until the rotational speed of the wheel and its associated axle again matches the speed of the rail vehicle. Once the rotational speed of the wheel/axle combination matches or perhaps briefly exceeds the speed of the rail vehicle, the wheel slip control system reapplies the braking force to the wheel. This process of detecting and correcting wheel slip occurs rapidly and generally continuously on most all of the wheel slip control systems in the art.

The system described in U.S. Pat. No. 4,071,282, entitled SLIP-SLIDE DETECTOR SYSTEM FOR RAILWAY CAR WHEELS, uses data from all of the axles on the vehicle to control wheel slip. This system, however, does not compensate for differences in diameter among the wheels. Depending on how much wear each wheel may have experienced, the wheels on the vehicle may exhibit significant differences in diameter. Consequently, the axles may rotate at different speeds. The system may then detect wheel slip even though in fact the problem may be simply due to differences in wheel diameter. More recently developed wheel slip control systems such as those alluded to below have overcome this problem.

A wheel slip control system typically controls such slipping through a wheel slip control valve. The slip control valve may be a distinct component that functions only in conjunction with the wheel slip control system or the same component that is used by the brake control system to modulate the braking during normal vehicle braking. The slip control valve is typically connected to the brake cylinder (s) or brake cylinder supply line(s) of the truck. The slip control valve on most systems is usually a dual solenoid valve capable of being commanded to assume any one of three positions. When commanded by the wheel slip controller to a release position, the slip control valve vents pressure from the brake cylinders so as to release the brakes on the truck. When commanded to lap position, the valve holds constant whatever pressure is currently in the brake cylinders. When commanded to an apply position, the slip control valve supplies pressure to the brake cylinders so as to reapply the brakes on the truck.

The operation of a slip control valve in one type of wheel slip control system is described in U.S. Pat. No. 4,491,920, entitled RATE POLARITY SHIFT WHEEL-SLIP CONTROL SYSTEM. This patent is assigned to the assignee of the present invention, and incorporated by reference into this document. This particular system detects wheel slip by monitoring the rate at which each wheel/axle combination decelerates during braking. A rate determining circuit on each truck determines which wheel/axle combination on the truck exhibits that highest (most negative) rate of deceleration. When the rate of deceleration increases below a first predetermined (negative) threshold, the wheel slip controller commands the slip control valve to the release position thereby reducing the force applied by the brakes to the wheels of that truck. This reduction in braking force allows the deceleration rate of the wheel/axle combination to change from being increasingly negative in value to decreasingly negative in value as the axle again approaches the speed of the vehicle. At this point, the rate of the wheel/axle combination, though still negative in value, is now moving positive in direction. The wheel/axle combination is thus accelerating so as to catch up to the speed of the vehicle. When the rate rises above a second predetermined (negative) threshold, the wheel slip controller commands the slip control valve to the lap position thereby maintaining whatever pressure is currently in the brake cylinders of the truck. Once the wheel/axle combination reaches the speed of the vehicle, its rate of change, though positive in value, is now again moving negative in direction because the vehicle has a negative acceleration due to the braking. When the speed of the axle matches that of the vehicle and its rate of change indeed moves in the negative direction, the wheel slip controller commands the slip control valve to the apply position thereby reapplying the brakes to the wheels of truck. Should wheel slip be detected again, the system will again correct it as noted above. It is through such detection and correction that the patented system continually addresses the problem of wheel slippage.

As is known in the transit industry, a passenger transit rail vehicle can be decelerated using either dynamic braking or friction braking or a combination of both. Such a transit vehicle typically has two axles per truck. Each axle on each truck typically has its own AC motor through which it may be propelled and dynamically braked. A single propulsion brake controller typically has (per truck) control over the two AC motors on its truck thereby electrically coupling the axles on the truck and enabling them to operate essentially in unison during propulsion and dynamic braking. The two axles of the truck likewise have friction brake control equipment in common according to typical practice in the transit industry.

There are two modes of operation for the brakes on a truck in such a passenger transit vehicle. The brakes operate in the decoupled mode when the wheel/axle combinations on the truck are braked using only the friction brake control equipment. During the decoupled mode of operation, the axles on the truck respond to such braking essentially independently. The brakes operate in the coupled mode of operation when the AC motors are used to electrically brake the axles on the truck. During the coupled mode, the propulsion brake controller simultaneously controls both AC motors and thus both axles on the truck. Though electrically coupled, the axles of the truck act as if they are mechanically coupled and operate essentially in unison during dynamic braking.

Many wheel slip control systems work in conjunction mostly with the friction brake control equipment, and merely remove dynamic braking until the wheel slipping problem has been corrected. For example, the slip control valve taught in U.S. Pat. No. 4,491,920, supra, can be commanded to the release, lap and reapply positions accordingly so as to correct the wheel slip that occurs during friction braking. Dynamic braking on the truck, though, may be addressed only to the extent that the propulsion brake controller controlling the AC motors is prevented from electrically braking the axles on the truck while the wheel slip is being corrected. Rail vehicles configured in this manner essentially have their wheel slip control systems alternately apply and release rapidly the friction brakes so that the affected wheel/axle combination experiences an averaged, reduced braking force.

Many other wheel slip control systems correct wheel slip by affecting the operation of both the friction braking and the dynamic braking equipment on the truck. An example of such a wheel slip control system appears in U.S. Pat. No. 5,752,212, entitled PROPORTIONAL POLARITY WHEEL SLIDE PROTECTION. This application is assigned to the assignee of the present invention, and incorporated by reference into this document. This particular system allows the dynamic and friction brake systems to operate basically in harmony while wheel slip is being controlled. It is incorporated into the overall brake control system so that the same devices used to modulate the braking force for normal vehicle braking will also be used to modulate the braking force during wheel slip control. Generally stated, this system directs both the dynamic brake equipment and the friction brake equipment to reduce, proportionately, the braking force that it applies to the axles of the affected truck. It does this by taking into account data such as the speed and the acceleration/deceleration rate of the wheel/axle combinations, the severity of the wheel slip and the duration of the wheel slip. This system controls wheel slip whether the vehicle is being decelerated using either dynamic braking or friction braking or a combination of both.

The wheel slip control system described in U.S. Pat. No. 4,941,099, entitled ELECTRONIC ADHESION ADAPTIVE WHEEL SLIDE PROTECTION ARRANGEMENT FUNCTION., is another example of a wheel slip control system that affects the operation of both the friction braking and the dynamic braking equipment on a truck. This patent is assigned to the assignee of the present invention, and incorporated by reference into this document. This particular system uses two detection circuits, a primary wheel slip detection circuit and a synchronous wheel slip detection circuit, each employing its own separate pattern recognition slip control logic. This system combines the separate slip control logic using a relatively complex scheme to correct slipping of the wheel/axle combination by modulating the force applied by the brakes to the affected wheel/axle combinations on the truck.

More relevant to the present invention is that the system described in U.S. Pat. No. 4,941,099 employs detection and correction parameters through which it detects and subsequently corrects slipping of the wheel/axle combinations on the truck. Like in other wheel slip control systems in the art, the parameters used by this patented system are stored in memory devices either individually or in the form of tables or both. The detection and correction parameters are constants each of which is generally preselected to work in connection with the circumstances of the particular application for which it was intended.

There are many wheel slip control systems that employ such detection and correction parameters according to principles known in the wheel slip control art. The detection parameters are used by the detection logic embodied in the programming code, whereas the correction parameters are used in the correction logic in the code. For example, as a microprocessor executes the instructions embodied in the programming code, the wheel slip controller monitors various input signals such as rotational speeds and the rates at which the wheel/axle combinations of the truck accelerate or decelerate. From these input signals and others, it may derive signals indicative of the vehicle speed, vehicle deceleration and other required information the nature of which depends on the particular wheel slip control system at issue. Based on such signals, the wheel slip controller retrieves the specific detection parameter(s) appropriate to the current operating conditions. Simply stated, the wheel slip controller uses the detection parameters in its detection logic when determining whether any of the wheel/axle combinations on the truck are actually experiencing slip. Similarly, once wheel slip is detected, the wheel slip controller retrieves the specific correction parameter(s) appropriate to the degree of slip experienced by the affected wheel/axle combination. It is these selected correction parameter(s) that the wheel slip controller uses in its correction logic when correcting the slip, i.e., temporarily reducing the braking force applied to the slipping wheel until such slipping ceases or reduces to an acceptable level.

The primary disadvantage common to all known prior art wheel slip control systems is that the detection and correction parameters they use are optimized only for the coupled mode of operation. Although this prior art approach enables a wheel slip control system to avoid lockup of the wheels in the decoupled mode of operation, overall stop performance suffers. A system employing this approach does not decelerate and stop a rail vehicle as efficiently as would be possible in a wheel slip control system featuring the present invention.

A related disadvantage common to all known prior art wheel Slip control Systems is that they do not implement the programming logic necessary to select the appropriate detection and correction parameters based on whether the axles of a truck are operating in the coupled or decoupled modes. Such programming logic, of course, is presented as part of the present invention.

There are other wheel slip control systems and methods that, in whole or in part, relate to the present invention. One such system is described in U.S. Pat. No. 5,471,387, entitled METHOD OF AND APPARATUS FOR THE COMBINED DETECTION OF SPEED VARYING ENERGY LEVEL WHEEL SLIP DETECTION AND DETERMINATION OF WHEEL SLIP INTENSITY OF A RAILWAY VEHICLE BRAKE SYSTEM. Another such system is described in U.S. Pat. No. 5,654,889, entitled SIMPLIFIED PATTERN RECOGNITION WHEEL SLIDE PROTECTION. The inventions described in these two documents are assigned to the assignee of the present invention, and both are incorporated by reference into this document.

It should be noted that the foregoing background information is provided to assist the reader in understanding the present invention. Accordingly, any terms used herein are not intended to be limited to any particular narrow interpretation unless specifically stated otherwise in this document.

SUMMARY OF THE INVENTION

In a presently preferred embodiment, the present invention provides a method of selecting detection and correction parameters for use by a wheel slip control system according to whether the wheel/axle combinations on a truck of a rail vehicle are operating in a coupled or a decoupled mode of operation. The wheel slip control system executes programming code featuring detection logic and correction logic. The steps of the method include monitoring the amount of dynamic braking that is applied to the wheel/axle combinations of the truck. The method also includes the step of generating a dynamic braking detection signal having (1) a logical one state when the amount of dynamic braking lies for a preset time period within a preset zone of operation for dynamic braking of the wheel/axle combinations on the truck or (2) a logical zero state when the amount of dynamic braking fails to lie within the preset zone for the preset time period. The method further includes the step of providing detection parameters optimized for the coupled mode to the detection logic of the wheel slip control system when the dynamic braking detection signal bears a logical one state. Alternately, it provides detection parameters optimized for the decoupled mode to the detection logic when the dynamic braking detection signal bears a logical zero state. The method also includes the step of receiving a wheel slip control status signal from the wheel slip control system to determine whether the wheel slip control system on the truck is active. Another step of the method includes generating a wheel slip state change priority signal having (1) a logical one state when the dynamic braking detection signal changes to a logical one state or (2) a logical zero state only if the dynamic braking detection signal changes to a logical zero state when the wheel slip control status signal indicates that the wheel slip control system is inactive. The method further includes the step of providing correction parameters optimized for the coupled mode to the correction logic of the wheel slip control system when the wheel slip state change priority signal bears a logical one state. Alternately, it provides correction parameters optimized for the decoupled mode to the correction logic when the wheel slip state change priority signal bears a logical zero state.

OBJECTIVES OF THE INVENTION

It is, therefore, a primary object of the present invention to provide a process through which a wheel slip control system can use detection and correction parameters optimized for both the coupled and decoupled modes of operation for any given combination of dynamic or friction braking applied to the wheel/axle combinations on a truck of a passenger transit rail vehicle.

Another objective of the present invention is to provide a process through which a wheel slip control system can decelerate and stop a rail vehicle more efficiently in a shorter distance than would be possible using prior art systems.

Yet another objective of the present invention is to provide a process through which a wheel slip control system optimizes stop performance and wheel lock avoidance whether the brakes applied to the wheel/axle combinations on the truck are operating in the coupled or decoupled modes of operation.

In addition to the objectives and advantages listed above, various other objectives and advantages of the present invention will become more readily apparent to persons skilled in the relevant art from a reading of the detailed description section of this document. The other objectives and advantages will become particularly apparent when the detailed description is considered along with the attached drawings and with the appended claims.

DETAILED DESCRIPTION OF THE INVENTION

Before describing the present invention in detail, the reader is advised that, for the sake of clarity and ease of understanding, the invention is described in the ensuing text as if incorporated into a passenger transit rail vehicle having two axles per truck. Each axle will be considered to have its own AC motor through which it may be propelled and dynamically braked. A single propulsion brake controller will be considered to have (per truck) control over the two AC motors on the truck thereby electrically coupling the axles on the truck and enabling them to operate essentially in unison during propulsion and dynamic braking. Similarly, the friction brakes on each axle of the truck will be considered to have friction brake control equipment in common.

As the present invention lends itself more readily to a microprocessor based system that employs an adhesion adaptive approach to controlling wheel slip, the detailed description of the invention will generally be described in terms of such a wheel slip control system. The wheel slip controller will be considered to have (per truck) control over the two axles on the truck rather than per vehicle control over all axles on the vehicle; though the present invention is also applicable to the latter arrangement.

Despite being described in this particular context, it should be apparent from a reading of this document that the invention may be incorporated into other types of vehicles on which the cited equipment may be configured differently from what is described in this document. The present method is presented in this context not to limit the invention but merely to simplify the description, and consequently the understanding, of the invention.

Figure 1A:
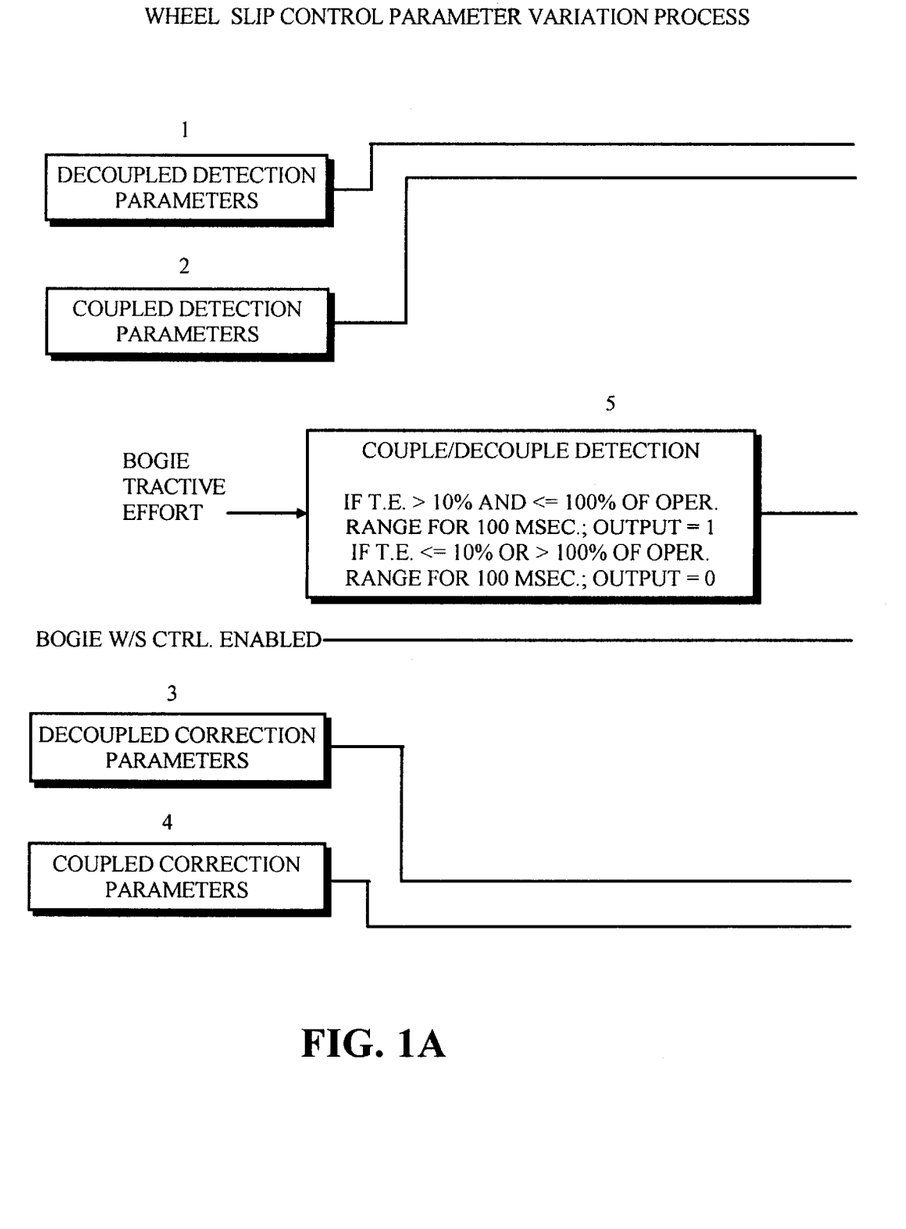
FIGS. 1A and 1B are a block diagram that illustrates a method through which a wheel slip control system can use detection and correction parameters optimized for both the coupled and decoupled modes of operation according to the present invention.
Figure 1B:
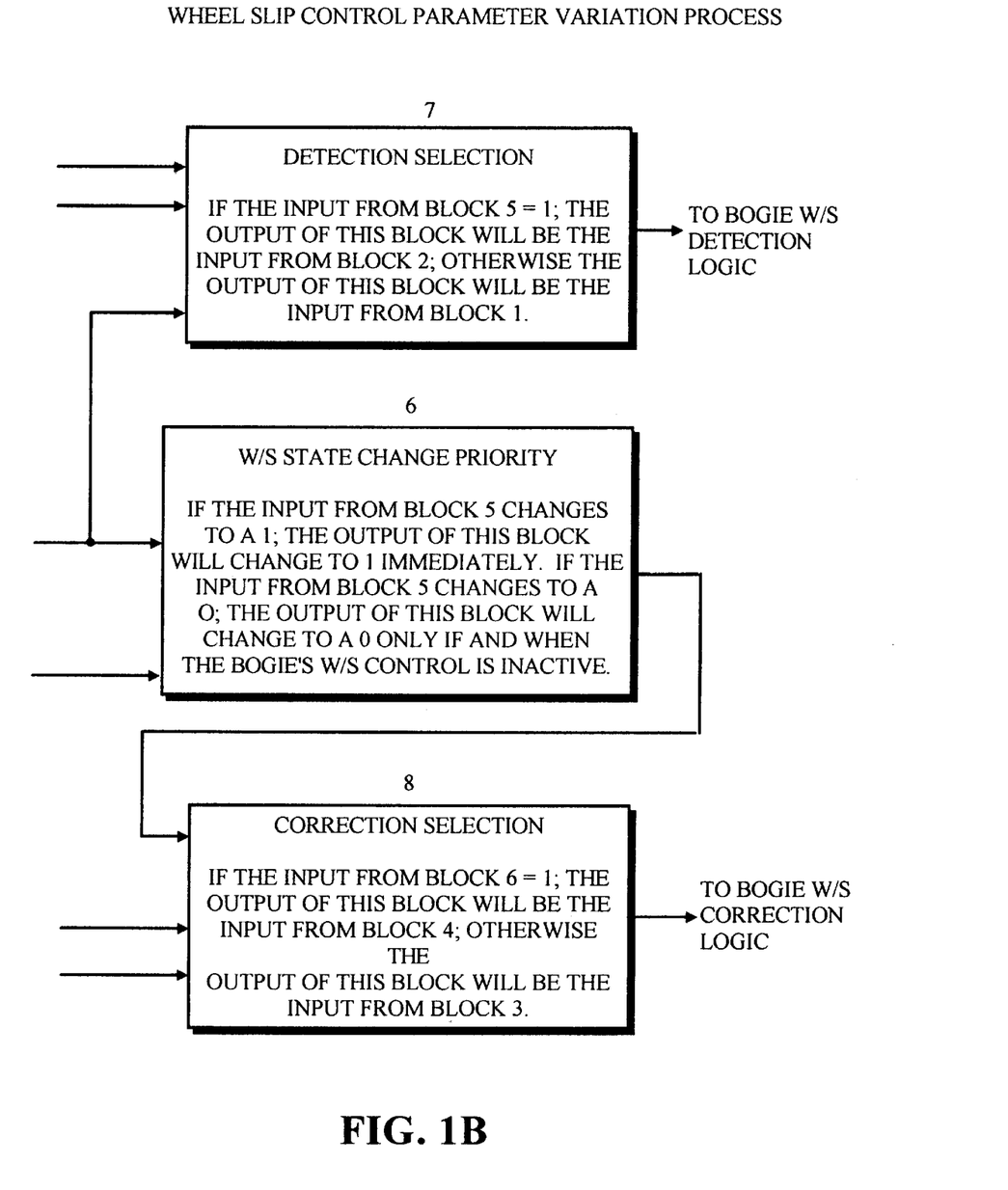

Referring now to the drawing, FIGS. 1A and 1B illustrate the process of the present invention through which a wheel slip control system can vary certain parameters it selects generally according to whether the axles of the truck are being decelerated using either dynamic braking or friction braking or a combination of both. The parameters used by the present invention may be stored, of course, in memory devices either individually or in the form of tables or both. These parameters are constants, with variable values, each of which is selected to work optimally in connection with the circumstances of its application. In other words, these parameters, whether individually or as part of a table, are generally "setup" or tuned to the particular application for which they are intended. They are to be used within the wheel slip control system as a referent for determining other variables necessary to detect and correct wheel slip.

These parameters fall into two categories one of which is referred to as the detection parameters and the other referred to as the correction parameters. Each category of parameters can be further divided into two groups one of which is referred to as coupled and the other referred to as decoupled. Unlike prior art systems, the present invention will thus allow a wheel slip control system to use parameters specifically optimized for the decoupled mode of operation as well as parameters specifically optimized for the coupled mode of operation.

Regarding the detection parameters, the wheel slip control system shall use them in its detection logic to determine whether a wheel/axle combination exhibits slippage exceeding a critical level above which correction becomes necessary. The wheel slip control system will use one group of detection parameters when the axles of the truck are operating in the decoupled mode of operation. This group of parameters can be referred to as the Decoupled Detection Parameters, as represented by Block 1. Generally stated, when the wheel/axle combinations on the truck are being braked using only the friction brake control equipment, the present invention passes to the detection logic of the wheel slip control system only those detection parameters optimized for the decoupled mode of operation. The wheel slip control system will use the other group of detection parameters, however, when the axles of the truck are operating in the coupled mode of operation. This group of parameters can be referred to as the Coupled Detection Parameters, as represented by Block 2. Generally stated, when the propulsion brake controller is using the AC motors to dynamically brake both axles on the truck, the present invention passes to the detection logic of the wheel slip control system only those detection parameters optimized for the coupled mode of operation. The Decoupled and Coupled Detection Parameters are represented by Blocks 1 and 2, respectively, of FIG. 1A.

Regarding the correction parameters, the wheel slip control system shall use these parameters in its correction logic to eliminate slippage of the affected wheel/axle combination or at least reduce it to an acceptable level. The wheel slip control system will use one group of correction parameters when the axles of the truck are operating in the decoupled mode of operation. This group of parameters can be referred to as the Decoupled Correction Parameters, as represented by Block 3. Generally stated, when the wheel/axle combinations on the truck are being braked using only the friction brake control equipment, the present invention passes to the correction logic of the wheel slip control system only those correction parameters optimized for the decoupled mode of operation. The wheel slip control system will use the other group of correction parameters, however, when the axles of the truck are operating in the coupled mode of operation. This group of parameters can be referred to as the Coupled Correction Parameters, as represented by Block 4. Generally stated, when the propulsion brake controller is using the AC motors to dynamically brake both axles on the truck, the present invention passes to the correction logic of the wheel slip control system only those correction parameters optimized for the coupled mode of operation. The Decoupled and Coupled Correction Parameters are, again, represented by Blocks 3 and 4, respectively, of FIG. 1A.

Block 5 of FIG. 1A basically represents the next step in the method of the present invention. This block receives a signal from another known part of a passenger transit or other type of rail vehicle with which the present invention is used. This signal, referred to as bogie tractive effort in FIG. 1A, is the dynamic brake feedback signal. The dynamic brake feedback signal ultimately comes from the propulsion brake controller of the truck and represents the amount of dynamic (i.e., electric) braking effort applied to the axles of the truck through the AC propulsion motors. The dynamic brake feedback signal, therefore, will be an input to Block 5 only while the axles of the truck are functioning in the coupled mode of operation.

Regarding the particular process step signified by Block 5, Block 5 basically represents a detecting device which senses the amount of dynamic braking actually applied to the axles of the truck. Block 5 essentially serves as a comparator which determines whether the amount of dynamic braking lies within or outside a preset zone within the range of operation for the dynamic brakes. Specifically, for example, the output of Block 5, hereinafter referred to as the dynamic braking detection signal, will be a logical "one" if for a preset time period (PTP) the amount of dynamic braking effort applied to the axles of the truck not only exceeds ten percent of the operational range but also is less than or equal to one hundred percent of the operational range. Conversely, the dynamic braking detection signal will be a logical "zero" if for the preset time period (PTP) the amount of dynamic braking is either less than or equal to ten percent of the operational range or greater than one hundred percent of the operational range. Should the dynamic braking effort indeed lie within this preset zone of operation for the preset time period, the dynamic brake detection signal will be a logical "one" thereby indicating that the axles of the truck are being dynamically braked and thus are electrically coupled.

The function of Block 5 can thus be generally represented by the following relationships:

---

IF DYNAMIC BRAKING EFFORT >10% AND ≦100% OF OPERATIONAL RANGE FOR PTP THEN DYNAMIC BRAKING DETECTION SIGNAL = 1.
IF DYNAMIC BRAKING EFFORT ≦10% OR >100% OF OPERATIONAL RANGE FOR PTP THEN DYNAMIC BRAKING DETECTION SIGNAL = 0.

---

The detecting device represented by Block 5 preferably uses a delay circuit or filter which implements the preset time period. If this filter circuit receives the dynamic brake feedback signal throughout the preset time period, it allows the corresponding dynamic braking detection signal to pass as the output of Block 5. This circuit therefore reduces the likelihood that short-lived noise or transients will adversely affect the process step represented by Block 5. The preset time period is preferably selected to be approximately one hundred milliseconds.

Regarding the selection of the appropriate group of detection parameters, Block 7 represents the next step in the method of the present invention. This block receives essentially one signal, specifically, the dynamic braking detection signal output from Block 5. It is the state of the dynamic braking detection signal that determines to which group of detection parameters the detection logic of the wheel slip control system will have access. When the axles of the truck are switched from the decoupled mode of operation to the coupled mode according to the aforementioned logic, the detection parameter(s) to which the detection logic will have access will change immediately from the Decoupled Detection Parameters of Block 1 to the Coupled Correction Parameters of Block 2. Conversely, when the truck axles are switched from the coupled mode of operation to the decoupled mode according to the aforementioned logic, the detection parameter(s) to which the detection logic will have access will change immediately from the Coupled Detection Parameters of Block 2 to the Decoupled Correction Parameters of Block 1.

Regarding the selection of the appropriate group of correction parameters, Block 6 of FIG. 1B represents the next step in the method of the present invention. This block receives two signals. The first signal that Block 6 receives is the dynamic braking detection signal output from Block 5. The second signal, referred to as bogie w/s control enabled in FIG. 1A, is the truck wheel slip control status signal. Originating in the wheel slip control system associated with the truck, this status signal indicates whether the wheel slip control on the truck is currently active. Manifested in the form of a binary signal for the logic circuitry represented by Block 6, the truck wheel slip control status signal assumes the logical "one" state if the wheel slip control on the truck is active. Conversely, this status signal assumes the logical "zero" state if the truck wheel slip control is inactive.

Regarding the particular process step signified by Block 6, Block 6 represents a detecting device which determines whether the wheel slip control system of the truck is active and whether the axles of the truck are electrically coupled. Specifically, for example, the output of Block 6, hereinafter referred to as the wheel slip state change priority signal, will assume a logical "one" state immediately whenever the dynamic braking detection signal received from Block 5 changes from a logical "zero" to a logical "one," regardless of the state of the wheel slip control status signal. Should the dynamic braking detection signal then change to a logical "zero," the state change priority signal output from Block 6 will remain a logical "one" as long as the wheel slip control status signal remains a logical one. In other words, when the dynamic braking detection signal changes to a logical "zero," the state change priority signal output from Block 6 will change to a logical "zero" only when the wheel slip control status signal occupies a logical "zero" state.

The function of Block 6 can thus be generally represented by the following relationships:

---

IF DYNAMIC BRAKING DETECTION SIGNAL CHANGES TO A LOGICAL "ONE" STATE, THEN STATE CHANGE PRIORITY SIGNAL IMMEDIATELY ASSUMES A LOGICAL "ONE" STATE, REGARDLESS OF STATE OF WHEEL SLIP CONTROL STATUS SIGNAL.
IF DYNAMIC BRAKING DETECTION SIGNAL CHANGES TO A LOGICAL "ZERO" STATE, THEN STATE CHANGE PRIORITY SIGNAL CHANGES TO A LOGICAL "ZERO" ONLY WHEN THE WHEEL SLIP CONTROL STATUS SIGNAL OCCUPIES A LOGICAL "ZERO" STATE.

---

It is clear from the first of these relationships that it is irrelevant whether the wheel slip control on the truck is active. When the dynamic braking detection signal changes to a logical "one" state, the wheel slip state change priority signal output from Block 6 simply changes to the logical "one" state. Generally, this indicates that the truck axles have been switched to the coupled mode of operation and are now subject to an amount of dynamic braking within the preset zone of operation prescribed by the present invention for the dynamic brakes on the truck.

It is equally clear from the second of these relationships that it is quite relevant whether the wheel slip control is active. If the dynamic braking detection signal changes to a logical "zero," the state change priority signal output from Block 6 will change to a logical "zero" only when the wheel slip control on the truck is inactive. Generally, this indicates that the axles of the truck are not subject to normal dynamic braking and thus are operating in the decoupled mode of operation.

Still explaining how the present invention selects the appropriate group of correction parameters, Block 8 represents the next step in the method of the present invention. This block receives essentially one signal, specifically, the wheel slip state change priority signal output from Block 6 It is the state of this state change priority signal that determines to which group of correction parameters the correction logic of the wheel slip control system will have access. The process step of Block 6, of course, determines the state of the state change priority signal, according to the aforementioned logic, based on the mode of operation in which the axles are operating and whether the wheel slip control is active. When the axles of the truck are switched from the decoupled mode of operation to the coupled mode according to the aforementioned logic, the correction parameter(s) to which the correction logic will have access will change immediately from the Decoupled Correction Parameters of Block 3 to the Coupled Correction Parameters of Block 4 Conversely, when the truck axles are switched from the coupled to the decoupled mode of operation according to the aforementioned logic, the correction parameter(s) to which the correction logic will have access will remain the Coupled Correction Parameters of Block 4 while the wheel slip control on the truck is actively correcting a slip condition. Only after the slip has been corrected (and the wheel slip control on the truck is no longer active) will the correction parameter(s) to which the correction logic has access change to the Decoupled Correction Parameters of Block 3. Through this later logic scheme, the present method places a priority on avoiding lockup of the wheels during a change in the group of correction parameters.

Once a wheel slip control system accesses the appropriate groups of detection and corrections parameters according to the present method, it can employ such parameters according to principles known in the wheel slip control art. For example, as a microprocessor executes the instructions embodied in the programming code, the wheel slip controller monitors various input signals such as rotational speeds and the rates at which the wheel/axle combinations of the truck accelerate or decelerate. From these input signals and others, it may derive signals indicative of the vehicle speed, vehicle deceleration and other required information the nature of which depends on the particular wheel slip control system at issue. Based on such signals, the wheel slip controller retrieves from the selected group of detection parameters the specific value(s) appropriate to the current operating conditions. The wheel slip controller uses theses values in its detection logic when determining whether any of the wheel/axle combinations on the truck are actually experiencing slip. Similarly, once wheel slip is detected, the wheel slip controller retrieves from the selected group of correction parameters the specific value(s) appropriate to the degree of slip experienced by the affected wheel/axle combination. It is these values that the wheel slip controller uses in its correction logic when correcting the slip so that it ceases or reduces to an acceptable level. This overall process of detecting and correcting wheel slip, of course, occurs rapidly and continuously.

Equipped with the present invention, a wheel slip control system can select the detection and correction parameters it uses according to whether the axles of the truck are being decelerated using either dynamic braking or friction braking or a combination of both. Unlike with prior art systems, the present invention allows a wheel slip control system to use parameters optimized for both the coupled and decoupled modes of operation. It therefore allows a vehicle so equipped to decelerate and stop more efficiently in a shorter distance than would be possible using prior art systems. Using this method, a wheel slip control system optimizes stop performance and wheel lock avoidance in both the coupled and decoupled modes of operation.

It should be apparent that the functions attributed to each of the blocks in FIGS. 1A and 1B may be performed by programming code executed via a system having a microprocessor accompanied by memory storage devices. The information needed for each block to perform its particular function(s) may then be conveyed from one block to another by writing the necessary data to memory wherefrom it can be retrieved by any one or more other blocks requiring such data. Though it may be possible to incorporate these functions into a separate microprocessor based system to which the wheel slip control system may be connected, the present process is preferably incorporated into the wheel slip control system, itself typically a microprocessor controlled system.

It should be apparent to persons skilled in the relevant art that the present invention could be implemented by a wide variety of wheel slip control systems. Though it could be carried out by a simple electronic wheel slip control system, the present invention is preferably implemented by a microprocessor based system that employs an adhesion adaptive approach to controlling wheel slip. Obvious modifications may be made, of course, depending upon the specific application in which the present invention is employed.

While the presently preferred embodiment for carrying out the invention has been set forth in detail according to the Patent Act, those persons of ordinary skill in the technical art to which this invention pertains will recognize various alternative ways of practicing the invention without departing from the spirit and scope of the appended claims. Those of ordinary skill will also recognize that the foregoing description is merely illustrative and is not intended to limit any of the following claims to any particular narrow interpretation.

Accordingly, to promote the progress of science and the useful arts, we secure for ourselves by Letters Pat. exclusive rights to all subject matter embraced by the following claims for the time prescribed by the Patent Act.

We claim:

1. A method of varying detection and correction parameters used by a system in controlling slip of wheel/axle combinations on a truck of a rail vehicle based on whether said wheel/axle combinations are being operated in at least one of a coupled and decoupled mode of operation, said wheel slip control system for executing programming code featuring detection logic and correction logic, said method comprising the steps of:

(a) deriving detection parameters optimized for both said coupled mode and said decoupled mode and correction parameters optimized for said coupled mode and said decoupled mode;

(b) monitoring an amount of dynamic braking applied to said wheel/axle combinations of said truck;

(c) determining whether said amount of dynamic braking lies for a preset time period within a preset zone of operation for dynamic braking of said wheel/axle combinations of said truck;

(d) providing said coupled detection parameters to said detection logic of said wheel slip control system if said amount of dynamic braking lies within said preset zone for said preset time period;

(e) providing said decoupled detection parameters to said detection logic of said wheel slip control system if said amount of dynamic braking fails to lie within said preset zone for said preset time period;

(f) providing said coupled correction parameters to said correction logic of said wheel slip control system if said amount of dynamic braking lies within said preset zone for said preset time period; and (g) providing said decoupled correction parameters to said correction logic of said wheel slip control system only if said amount of dynamic braking fails to lie within said preset zone for said preset time period when said wheel slip control system is inactive.

2. The method of varying detection and correction parameters as recited in claim 1 wherein said preset zone lies approximately between ten percent and one hundred percent of operational range of operation for said dynamic braking.

3. The method of varying detection and correction parameters as recited in claim 1 wherein said preset time period is approximately one hundred milliseconds.

4. A method of selecting detection and correction parameters for use by a wheel slip control system according to whether wheel/axle combinations on a truck of a rail vehicle are operating in a coupled or a decoupled mode of operation, said wheel slip control system for executing programming code featuring detection logic and correction logic, said method comprising the steps of:

(a) monitoring an amount of dynamic braking applied to said wheel/axle combinations of said truck;

(b) generating a dynamic braking detection signal having a logical one state when said amount of dynamic braking lies for a preset time period within a preset zone of operation for dynamic braking of said wheel/axle combinations of said truck and a logical zero state when said amount of dynamic braking fails to lie within said preset zone for said preset time period;

(c) providing detection parameters optimized for said coupled mode to said detection logic of said wheel slip control system when said dynamic braking detection signal bears a logical one state;

(d) providing detection parameters optimized for said decoupled mode to said detection logic of said wheel slip control system when said dynamic braking detection signal bears a logical zero state;

(e) receiving a wheel slip control status signal from said wheel slip control system which determine whether said wheel slip control system of said truck is active;

(f) generating a wheel slip state change priority signal having a logical one state when said dynamic braking detection signal changes to a logical one state and a logical zero state only if said dynamic braking detection signal changes to a logical zero state when said wheel slip control status signal indicates that said wheel slip control system is inactive;

(g) providing correction parameters optimized for said coupled mode to said correction logic of said wheel slip control system when said wheel slip state change priority signal bears a logical one state; and (h) providing correction parameters optimized for said decoupled mode to said correction logic of said wheel slip control system when said wheel slip state change priority signal bears a logical zero state.

5. The method of selecting detection and correction parameters as recited in claim 4 wherein said preset zone lies approximately between ten percent and one hundred percent of an operational range of operation for said dynamic braking.

6. The method of selecting detection and correction parameters as recited in claim 4 wherein said preset time period is approximately one hundred milliseconds.

7. A method of selecting detection and correction parameters for use by a wheel slip control system according to whether wheel/axle combinations on a truck of a rail vehicle are operating in a coupled or a decoupled mode of operation, said wheel slip control system for executing programming code featuring detection logic and correction logic, said method comprising the steps of:

(a) monitoring an amount of dynamic braking applied to said wheel/axle combinations of said truck;

(b) determining whether said amount of dynamic braking lies for a preset time period within a preset zone of operation for dynamic braking of said wheel/axle combinations of said truck;

(c) providing detection parameters optimized for said coupled mode to said detection logic of said wheel slip control system if said amount of dynamic braking lies within said preset zone for said preset time period;

(d) providing detection parameters optimized for said decoupled mode to said detection logic of said wheel slip control system if said amount of dynamic braking fails to lie within said preset zone for said preset time period;

(e) providing correction parameters optimized for said coupled mode to said correction logic of said wheel slip control system if said amount of dynamic braking lies within said preset zone for said preset time period; and (f) providing correction parameters optimized for said decoupled mode to said correction logic of said wheel slip control system only if said amount of dynamic braking fails to lie within said preset zone for said preset time period when said wheel slip control system is inactive.

8. The method of selecting detection and correction parameters as recited in claim 7 wherein said preset zone lies approximately between ten percent and one hundred percent of operational range of operation for said dynamic braking.

9. The method of selecting detection and correction parameters as recited in claim 7 wherein said preset time period is approximately one hundred milliseconds.

10. A method of varying detection and correction parameters used by a system in controlling slip of wheel/axle combinations on a truck of a rail vehicle based on whether said wheel/axle combinations are being operated in a coupled or decoupled mode of operation, said wheel slip control system for executing programming code featuring detection logic and correction logic, said method comprising the steps of:

(a) deriving detection parameters optimized for both said coupled mode and said decoupled mode and correction parameters optimized for both said coupled mode and said decoupled mode;

(b) monitoring an amount of dynamic braking applied to said wheel/axle combinations of said truck;

(c) generating a dynamic braking detection signal having a logical one state when said amount of dynamic braking lies for a preset time period within a preset zone of operation for dynamic braking of said wheel/axle combinations of said truck and a logical zero state when said amount of dynamic braking fails to lie within said preset zone for said preset time period;

(d) providing said coupled detection parameters to said detection logic of said wheel slip control system when said dynamic braking detection signal bears a logical one state;

(e) providing said decoupled detection parameters to said detection logic of said wheel slip control system when said dynamic braking detection signal bears a logical zero state;

(f) receiving a wheel slip control status signal from said wheel slip control system to determine whether said wheel slip control system of said truck is active;

(g) generating a wheel slip state change priority signal having a logical one state when said dynamic braking detection signal changes to a logical one state and a logical zero state only if said dynamic braking detection signal changes to a logical zero state when said wheel slip control status signal indicates that said wheel slip control system is inactive;

(h) providing said coupled correction parameters to said correction logic of said wheel slip control system when said wheel slip state change priority signal bears a logical one state; and (i) providing said decoupled correction parameters to said correction logic of said wheel slip control system when said wheel slip state change priority signal bears a logical zero state.

11. The method of varying detection and correction parameters as recited in claim 10 wherein said preset zone lies approximately between ten percent and one hundred percent of an operational range of operation for said dynamic braking.

12. The method of varying detection and correction parameters as recited in claim 10 wherein said preset time period is approximately one hundred milliseconds.

* * * * *